(12) United States Patent
Xing et al.

(10) Patent No.: US 9,380,504 B2
(45) Date of Patent: Jun. 28, 2016

(54) METHOD, USER EQUIPMENT, AND BASE STATION FOR CHANGING ACCESS CELL

(71) Applicant: Huawei Technologies Co., LTD, Shenzhen (CN)

(72) Inventors: Pingping Xing, Shanghai (CN); Mingzeng Dai, Shanghai (CN); Jun Qin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 100 days.

(21) Appl. No.: 14/155,898

(22) Filed: Jan. 15, 2014

(65) Prior Publication Data

US 2014/0128069 A1    May 8, 2014

Related U.S. Application Data

(63) Continuation of application No. PCT/CN2012/078658, filed on Jul. 14, 2012.

(51) Int. Cl.
*H04W 36/00* (2009.01)
*H04W 36/14* (2009.01)
(Continued)

(52) U.S. Cl.
CPC .......... *H04W 36/14* (2013.01); *H04W 36/0016* (2013.01); *H04W 36/0083* (2013.01);
(Continued)

(58) Field of Classification Search
CPC ... H04W 36/022; H04W 36/14; H04W 36/30; H04W 36/0083; H04W 84/045; H04W 36/0005; H04W 36/08; H04W 24/10; H04W 36/0061; H04W 36/0016; H04W 36/0072; H04W 36/18; H04W 36/0022; H04W 24/08; H04W 36/0066; H04W 72/0413; H04W 12/08

USPC .......... 370/332, 329, 331, 328; 455/436, 437, 455/438, 418, 550.1, 434, 442, 450, 452.1, 455/560, 561, 574, 67.11, 90.2
See application file for complete search history.

(56) References Cited

U.S. PATENT DOCUMENTS

2006/0073831 A1* 4/2006 Guyot et al. .................. 455/443
2007/0173250 A1* 7/2007 Lee et al. ...................... 455/423
(Continued)

FOREIGN PATENT DOCUMENTS

CN    101076192 A    11/2007
CN    101137142 A    3/2008
(Continued)

OTHER PUBLICATIONS

Chinese International Search Report of PCT, International Application No. PCT/CN2012/078658, date of mailing Oct. 25, 2012, 10 pages.
(Continued)

*Primary Examiner* — Fred Casca
(74) *Attorney, Agent, or Firm* — Slater Matsil, LLP

(57) ABSTRACT

The present invention discloses a method, a user equipment, and a base station for changing an access cell. According to the method, the user equipment, and the base station in the embodiments of the present invention, when the UE leaves the coverage of the first radio network and the UE is in the dual-camped state, the first cell of the first radio network that the UE currently accesses is changed to the second cell of the second radio network that the UE currently accesses, so as to avoid a cell change failure caused by an incorrect target cell during cell reselection or handover, thereby accurately changing an access cell, reducing network delay, and improving user experience.

15 Claims, 9 Drawing Sheets

(51) Int. Cl.
*H04W 36/30* (2009.01)
*H04W 60/00* (2009.01)
*H04W 88/06* (2009.01)
*H04W 84/04* (2009.01)
*H04W 24/10* (2009.01)
*H04W 76/04* (2009.01)

(52) U.S. Cl.
CPC .............. *H04W36/30* (2013.01); *H04W 60/00* (2013.01); *H04W 88/06* (2013.01); *H04W 24/10* (2013.01); *H04W 36/0066* (2013.01); *H04W 76/046* (2013.01); *H04W 84/045* (2013.01)

(56) References Cited

U.S. PATENT DOCUMENTS

| | | | |
|---|---|---|---|
| 2008/0049675 A1* | 2/2008 | Burgan et al. | 370/331 |
| 2008/0318574 A1 | 12/2008 | Bi | |
| 2009/0047956 A1* | 2/2009 | Moe | H04J 11/0093 455/436 |
| 2009/0239582 A1 | 9/2009 | Lin | |
| 2009/0247150 A1* | 10/2009 | Fischer et al. | 455/425 |
| 2009/0296660 A1* | 12/2009 | Weng | 370/332 |
| 2010/0003979 A1* | 1/2010 | Iwamura et al. | 455/436 |
| 2010/0272064 A1* | 10/2010 | Chen | 370/331 |
| 2012/0020231 A1* | 1/2012 | Chen et al. | 370/252 |

FOREIGN PATENT DOCUMENTS

| | | |
|---|---|---|
| CN | 101400096 A | 4/2009 |
| CN | 101500292 A | 8/2009 |
| CN | 101977370 A | 2/2011 |
| CN | 102118682 A | 7/2011 |
| EP | 2182760 A1 | 5/2010 |

OTHER PUBLICATIONS

83161462EP03 Extended European Search Report (EESR), International Application No. PCTCN2012/078658, date of mailing Jul. 4, 2014.

* cited by examiner

METHOD, USER EQUIPMENT, AND BASE STATION FOR CHANGING ACCESS CELL

This application is a continuation of International Application No. PCT/CN2012/078658, filed on Jul. 14, 2012, which claims priority to Chinese Patent Application No. 201110198464.4, filed on Jul. 15, 2011, both of which are hereby incorporated by reference in their entireties.

TECHNICAL FIELD

The present invention relates to the communications field, and in particular, to a method, a user equipment, and a base station for changing an access cell in the communications field.

BACKGROUND

Currently, 2nd generation mobile communications technology/3rd generation mobile communications technology (2nd Generation/3rd Generation, "2G/3G") networks, such as Global System for Mobile communications (Global System of Mobile communication, "GSM") networks, have been widely deployed in many regions. Therefore, to some extent, 2G/3G networks can be considered to have complete coverage. With the rapid development of communications technologies, new generation evolved networks such as Long Term Evolution ("LTE") networks have covered some urban areas and traffic hotspot regions, and therefore evolved networks and 2G/3G networks coexist in these areas.

During early deployment of LTE, LTE only supports data services, and does not support voice services. Therefore, operators may use 2G/3G networks to provide voice services for subscribers on the one hand, and may use LTE networks to provide data services for subscribers on the other hand. In order to improve user experience, a terminal may be a multi-transceiver multi-mode terminal that supports single-number dual-camped, where voice services are borne over a GSM network, and data services are borne over an LTE network. The terminal may include a GSM module and an LTE module, where the GSM module may camp on the GSM network, and establish services in the GSM network, and the LTE module may camp on the LTE network, and establish services in the LTE network.

Data services belong to packet switched (Packet Switching, "PS") domain services, and voice services belong to circuit switched (Circuit Switching, "CS") domain services. In an area simultaneously covered by a GSM network and an LTE network, a terminal that supports single-number dual-camped accesses the GSM network in a CS domain, and accesses the LTE network in a PS domain, and therefore the terminal can establish a voice service in the GSM network and establish a data service in the LTE network concurrently.

However, in an area only covered by a GSM network, a terminal can access the GSM network in both the CS domain and the PS domain, but whether the terminal can establish a voice service and a data service concurrently needs to be determined by capabilities of the terminal and capabilities of the GSM network. In addition, only when both the terminal and the GSM network support the dual transmission mode ("DTM") can the terminal establish a voice service and a data service concurrently. Otherwise, the terminal will suspend a service, and generally, the terminal will suspend the data service.

An LTE network generally has partial coverage during early network deployment, and generally only covers urban areas or hotspot areas. Because complete coverage is not yet realized, when a terminal that supports single-number dual-camped leaves the LTE network, the terminal needs to reselect or be handed over to a target GSM cell. Therefore, an appropriate solution is required to support an user equipment in reselecting or being handed over to an appropriate target cell.

SUMMARY OF THE INVENTION

Embodiments of the present invention provide a method, a user equipment, and a base station for changing an access cell, which are capable of supporting a user equipment in reselecting or being handed over to an appropriate target cell.

In one aspect, an embodiment of the present invention provides a method for changing an access cell. The method includes determining that a user equipment UE leaves coverage of a first radio network. When an access state of the UE is a dual-camped state, a first cell of the first radio network that the UE currently accesses is changed to a second cell of a second radio network that the UE currently accesses.

In another aspect, an embodiment of the present invention provides a method for changing an access cell. The method includes receiving state information sent by a user equipment UE. The state information includes an access state of the UE, and determining that the UE leaves coverage of a first radio network. A handover command is sent to the UE according to the state information. The handover command instructs the UE to be handed over when the access state is a dual-camped state to a second cell of a second radio network that the UE currently accesses.

In still another aspect, an embodiment of the present invention provides an user equipment. The user equipment includes a determining module configured to determine that the user equipment UE leaves coverage of a first radio network. A changing module is configured to, when an access state of the UE is a dual-camped state, change a first cell of the first radio network that the UE currently accesses to a second cell of a second radio network that the UE currently accesses.

In yet another aspect, an embodiment of the present invention provides a base station, which includes a first receiving module configured to receive state information sent by a user equipment UE. The state information includes an access state of the UE. A determining module is configured to determine that the UE leaves coverage of a first radio network. A first sending module is configured to send a handover command to the UE according to the state information. The handover command instructs the UE to be handed over, when the access state is a dual-camped state, to a second cell of a second radio network that the UE currently accesses.

Based on the above technical solution, according to the method, the user equipment, and the base station for changing an access cell in the embodiments of the present invention, when the UE leaves the coverage of the first radio network and the access state of the UE is the dual-camped state, the first cell of the first radio network that the UE currently accesses is changed to the second cell of the second radio network that the UE currently accesses, so as to avoid a cell change failure caused by an incorrect target cell during cell reselection or handover, thereby accurately changing an access cell, reducing network delay, and improving user experience.

BRIEF DESCRIPTION OF THE DRAWINGS

To illustrate the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be understood that the technical solutions of the present invention may be applied to various communications systems, such as the Global System for Mobile communications ("GSM"), a Code Division Multiple Access ("CDMA") system, a Wideband Code Division Multiple Access ("WCDMA") system, General Packet Radio Service ("GPRS"), a Long Term Evolution ("LTE") system, an LTE Frequency Division Duplex ("FDD") system, LTE Time Division Duplex ("TDD"), and the Universal Mobile Telecommunications System ("UMTS"). The embodiments of the present invention are described by taking the GSM network and the LTE network as an example, but the embodiments of the present invention are not limited thereto.

It should be further understood that in the embodiments of the present invention, a terminal may also be called a user equipment ("UE"), a mobile station ("MS"), a mobile terminal, and so on. The terminal can communicate with one or more core networks through a radio access network ("RAN"). For example, the terminal may be a mobile phone (or called a "cellular" phone) or a computer equipped with a mobile terminal. For example, the terminal may also be a portable, pocket, handheld, computer-embedded, or vehicle-mounted mobile apparatus, which exchanges voices and/or data with the radio access network.

In the embodiments of the present invention, a base station may be a base station (Base Transceiver Station, "BTS") in GSM, may be a base station (NodeB, "NB") in WCDMA, and may also be an evolved base station (Evolutional Node B, "ENB or e-NodeB") in LTE, which is not limited in the embodiments of the present invention. However, for ease of description, the following embodiments are described by taking the ENB as an example.

Figure 1:
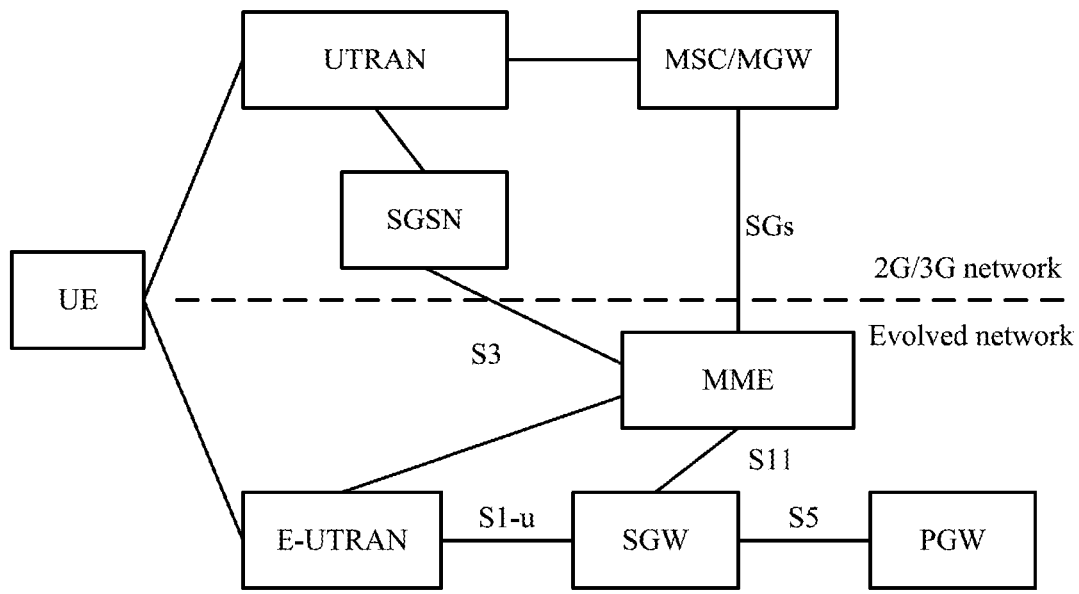
FIG. 1 is a schematic frame diagram of a system supporting single-number dual-camped according to an embodiment of the present invention.

For ease of understanding, a schematic frame diagram of a system supporting single-number dual-camped according to an embodiment of the present invention is described firstly with reference to FIG. 1. As shown in FIG. 1, an Evolved Universal Terrestrial Radio Access Network ("E-UTRAN") is essentially composed of evolved base stations (ENB). A core network part of the evolved network includes a mobility management entity ("MME") and a System Architecture Evolution ("SAE") gateway, where the SAE gateway includes a serving gateway ("SGW") and a packet data network gateway ("PGW"). The MME is a control plane node of the core network part of the evolved network system, whose function is to manage user equipment ("UE") contexts and user plane bearers. A main function of the SGW is to transmit service data, and a main function of the PGW is to transmit signaling.

A UMTS Terrestrial Radio Access Network ("UTRAN") is an access network of a 2G/3G network, where a mobile switching center ("MSC") is mainly responsible for bearing and controlling voice services, a media gateway ("MGW") is mainly responsible for bearing CS voice services, and a serving GPRS support node ("SGSN", where GPRS stands for General Packet Radio Service) is mainly responsible for bearing and controlling data services.

Figure 2:
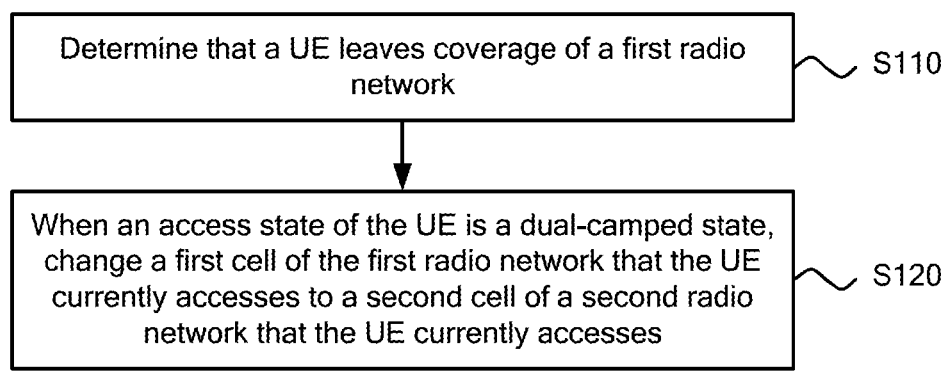
FIG. 2 is a schematic flowchart of a method for changing an access cell according to an embodiment of the present invention.

FIG. 2 is a schematic flowchart of a method for changing an access cell according to an embodiment of the present invention. As shown in FIG. 2, the method includes:

S110. Determine that a user equipment UE leaves coverage of a first radio network; and S120. When an access state of the UE is a dual-camped state, change a first cell of the first radio network that the UE currently accesses to a second cell of a second radio network that the UE currently accesses.

In an area simultaneously covered by the first radio network such as an LTE network and the second radio network such as a GSM network, for a UE that supports single-number dual-camped or dual-number dual-camped, which means that the UE can access the first radio network and the second radio network simultaneously, when the UE determines that the UE leaves the coverage of the first radio network, for example, when the UE determines that signal quality of an LTE cell is lower than a threshold value, or when the UE receives from a network side device a command of leaving the LTE network, and if the UE is in the dual-camped state, the UE changes the first cell of the first radio network that the UE currently accesses to the second cell of the second radio network that the UE currently accesses, so as to switch a network accessed in a PS domain from the first radio network to the second radio network.

Therefore, according to the method for changing an access cell in the embodiment of the present invention, when the UE leaves the coverage of the first radio network and the access state of the UE is the dual-camped state, the first cell of the first radio network that the UE currently accesses is changed to the second cell of the second radio network that the UE currently accesses, so as to avoid a cell change failure caused by an incorrect target cell during cell reselection or handover, thereby accurately changing an access cell, reducing network delay, and improving user experience.

It should be understood that in the embodiment of the present invention, the first radio network includes LTE networks and networks that are developed subsequently, such as TDD and FDD; and the second radio network includes 2G/3G networks, such as GSM, UMTS, and Time Division—Synchronous Code Division Multiple Access ("TD-SCDMA"). The embodiment of the present invention is described by taking the LTE network and the GSM network as an example, but the present invention is not limited thereto. For example, the first radio network is an LTE network, and the second radio network is a GSM network.

It should be further understood that the access state of the UE includes a single-camped state (Single Camped) and the dual-camped state (Multi Camped). The single-camped state means that the UE accesses only one network currently. For example, the UE only accesses the GSM network, or the UE only accesses the LTE network. The dual-camped state means that the UE accesses two types of networks currently. For example, the UE accesses the GSM network and the LTE network concurrently. It should be understood that the embodiment of the present invention is mainly intended for scenarios where a UE is in the dual-camped state. When a UE is in the single-camped state, the UE can be handed over from an LTE network to a GSM network according to related technologies.

In the embodiment of the present invention, the UE supports single-number dual-camped or dual-number dual-camped, which means that the UE can access the first radio network and the second radio network simultaneously. The UE may include a first module accessing the first radio network and a second module accessing the second radio network. For example, the first module is an LTE module, and the second module is a GSM module. Service states of the first module and the second module include a connected state (Connected State) and an idle state (Idle State).

Optionally, when the UE's first module accessing the first radio network is in the idle state, and the access state of the UE is the dual-camped state, S120 specifically includes: initiating packet switched PS domain registration in the second cell of the second radio network that the UE currently accesses. Optionally, when the UE's first module accessing the first radio network is in the connected state, and the access state of the UE is the dual-camped state, S120 specifically includes: according to a handover command, initiating a handover from the first radio network to the second radio network by taking the second cell as a target cell.

Specific embodiments of the method for changing an access cell according to the embodiment of the present invention when the first module is in the idle state and the connected state are described with reference to FIG. 3 to FIG. 5, respectively.

Figure 3:
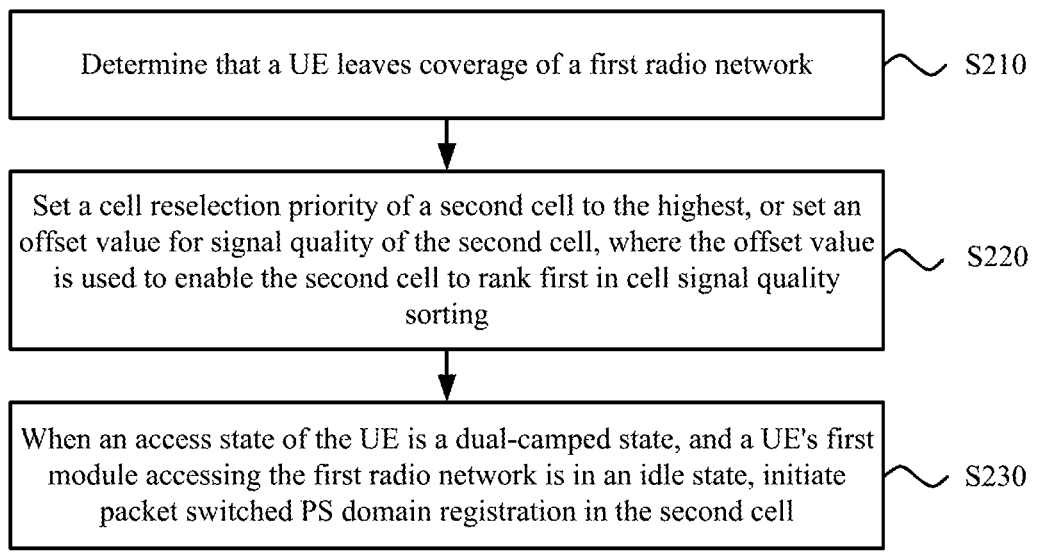
FIG. 3 is a schematic flowchart of a specific embodiment of the method for changing an access cell according to the embodiment of the present invention.

FIG. 3 is a schematic flowchart of a specific embodiment of the method for changing an access cell according to the embodiment of the present invention. As shown in FIG. 3, when the UE's first module is in the idle state, the method includes the following steps:

S210. The UE determines that the UE leaves the coverage of the first radio network. Optionally, when signal quality of a serving cell in the first radio network is lower than a threshold value, and no other first radio network cell is appropriate, the UE can determine that the UE is about to leave or has already left the coverage of the first radio network. Optionally, the UE may also determine that the UE leaves the coverage of the first radio network by receiving from a network side device a message of leaving the first radio network.

S220. The UE sets a cell reselection priority of the second cell of the second radio network that the UE currently accesses to the highest, so as to enable the second cell to rank first in cell signal quality sorting; or the UE may also add an offset value (Qoffset) to the signal quality of the second cell, where the offset value is large enough to enable the second cell to rank first in the cell signal quality sorting, so that the UE can initiate PS domain registration in the second cell when determining that the UE leaves the coverage of the first radio network.

S230. When the UE is in the dual-camped state and the UE's first module is in the idle state, the UE initiates PS domain registration in the second cell, so as to enable the network accessed in the PS domain to be switched from the second radio network to the first radio network.

According to the method in the embodiment of the present invention, when the UE leaves the coverage of the first radio network, and when the UE is in the dual-camped state, and the UE's first module is in the idle state, the UE directly initiates PS domain registration in the second cell that the UE currently accesses, or sets the cell reselection priority of the second cell to the highest, or sets an offset value for the signal quality of the second cell, which is large enough to enable the second cell to rank first in the cell signal quality sorting, thereby being capable of ensuring that the UE initiates the PS domain registration in the second cell. Therefore, the method in the embodiment of the present invention is capable of accurately changing the access cell, reducing the network delay, and improving the user experience.

Figure 4:
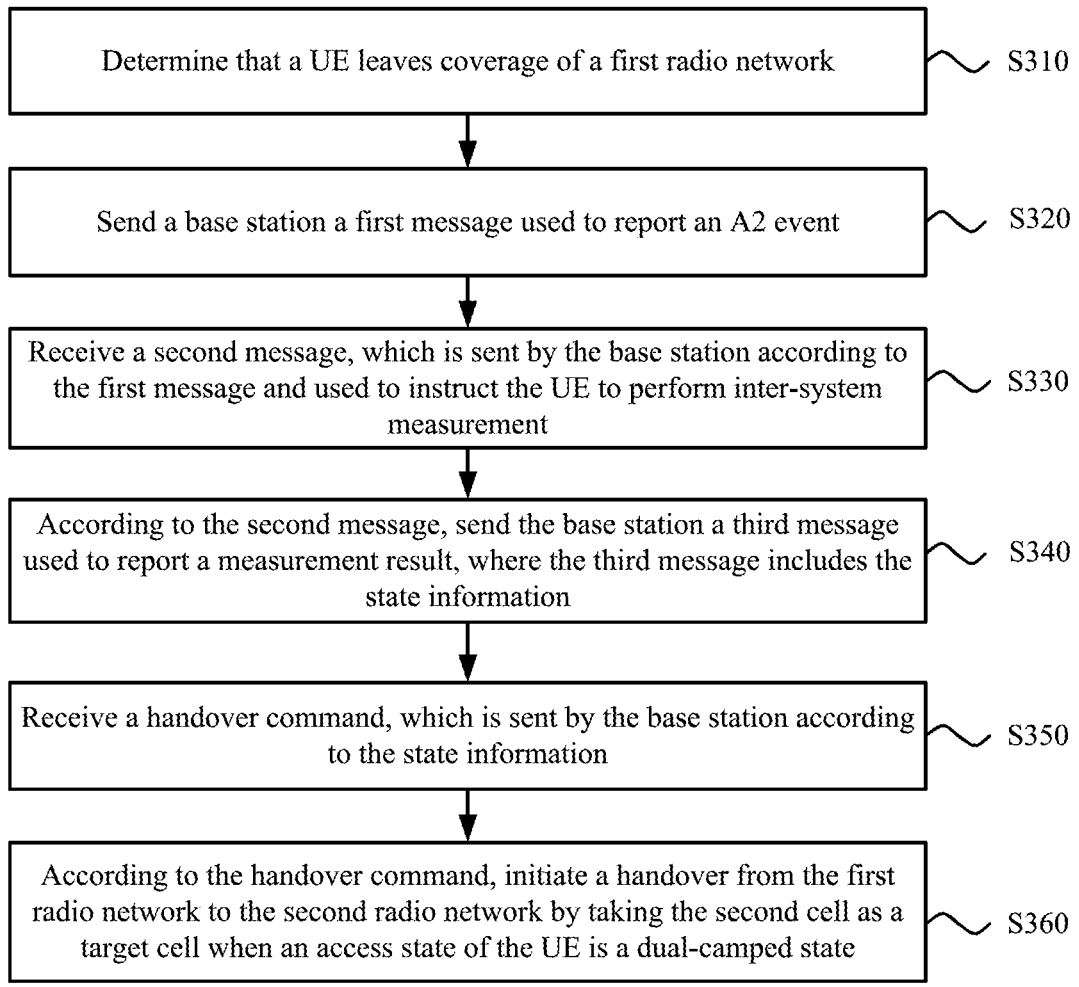
FIG. 4 is a schematic flowchart of another specific embodiment of the method for changing an access cell according to the embodiment of the present invention.
Figure 5:
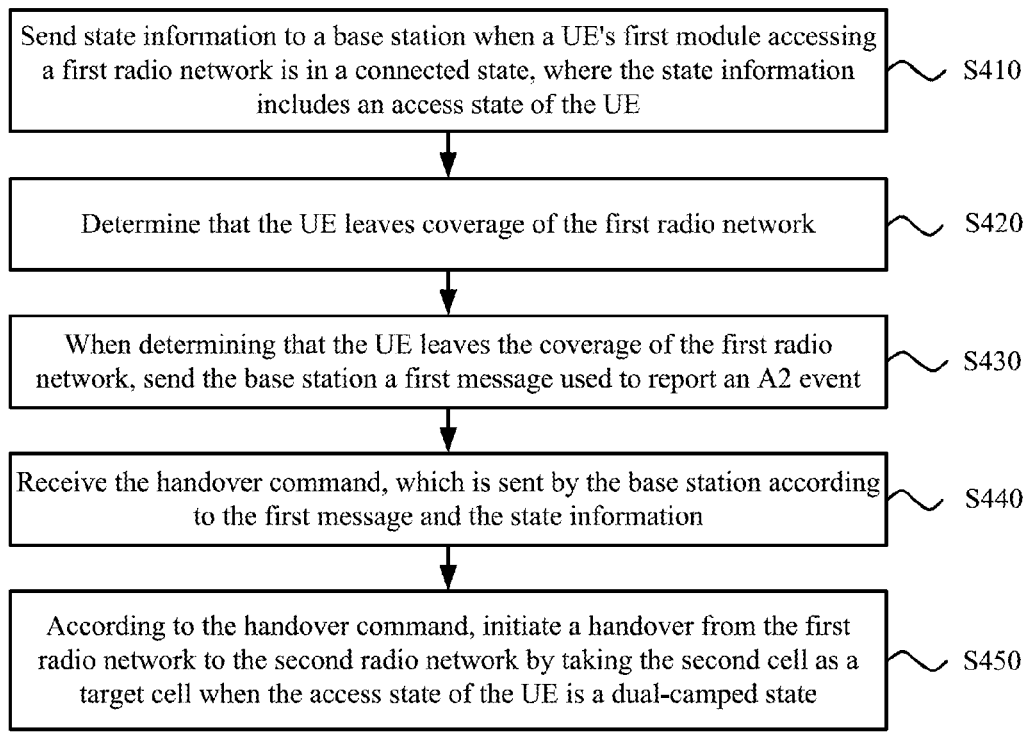
FIG. 5 is a schematic flowchart of still another specific embodiment of the method for changing an access cell according to the embodiment of the present invention.

FIGS. 4 and 5 are schematic flowcharts of specific embodiments of the method for changing an access cell according to the embodiment of the present invention. As shown in FIG. 4 and FIG. 5, the method for changing an access cell may further include sending state information to a base station when the UE's first module accessing the first radio network is in the connected state. The state information includes the access state of the UE. A handover command, which is sent by the base station according to the state information, is received. The changing the first cell of the first radio network that the UE currently accesses to the second cell of the second radio network that the UE currently accesses includes initiating a handover from the first radio network to the second radio network by taking the second cell as a target cell according to the handover command when the access state of the UE is the dual-camped state.

Specifically, as shown in FIG. 4, when the UE's first module is in the connected state, the method includes the following steps:

S310. The UE determines that the UE leaves the coverage of the first radio network. For example, the UE determines, according to that the signal quality of the LTE cell that the UE currently accesses is lower than the threshold value, that the UE has already left or is about to leave the coverage of the LTE network.

S320. When determining that the UE leaves the coverage of the first radio network, the UE sends the base station a first message used to report an A2 event, where the A2 event indicates that the signal quality of the first cell of the first radio network that the UE currently accesses is lower than the threshold value.

S330. The UE receives a second message, which is sent by the base station according to the first message and used to instruct the UE to perform inter-system measurement, where the second message is used to instruct the UE to measure the signal quality of the second cell.

S340. According to the second message, the UE sends the base station a third message used to report a measurement result, where the third message includes the state information. For example, when the UE is in the dual-camped state, the UE may measure signal quality of a GSM cell according to a GSM inter-system measurement control message, and send the base station a message used to report a measurement result, where the message may include the state information, and the state information includes an identity of the GSM cell that the UE currently accesses.

Optionally, the state information includes a second cell identity for identifying the second cell. Optionally, the state information further includes at least one of the current access state of the UE and the service state of the second module. That is, the state information includes information about whether the UE is in the dual-camped state currently and/or whether the second module is in the connected state.

S350. The UE receives the handover command, which is sent by the base station according to the state information, where the handover command is used to instruct the UE to be handed over to the second cell. It should be understood that after receiving the third message sent by the UE, the base station may determine, according to the state information and/or other information carried in the third message, that the UE is handed over to the second cell of the second radio network that the UE currently accesses.

S360. According to the handover command, the UE initiates a handover from the first radio network to the second radio network by taking the second cell as a target cell when the access state of the UE is the dual-camped state. For example, the UE is handed over from the LTE cell to the GSM cell that the UE currently accesses, so that the UE switches the network accessed in the PS domain from the LTE network to the GSM network. For example, the UE initiates a common process of a handover from an LTE network to a GSM network, where the target cell is the GSM cell that the UE currently accesses, so that the UE can be handed over from the LTE cell to the GSM cell that the UE currently accesses.

In the embodiment of the present invention, sending, by the UE, the state information to the base station may include: sending, by the UE's second module accessing the second radio network, the identity of the second cell and the service state and access state of the second module to the UE's first module accessing the first radio network; and sending, by the UE's first module, the state information to the base station according to the identity, and the service state and the access state of the second module.

For example, a GSM module of the UE may send any information of the identity of the GSM cell that the UE currently accesses, and the service state and the access state of the GSM module to an LTE module. Optionally, the GSM module sends the identity of the GSM cell, and the service state and the access state of the GSM module to the LTE module. In this way, when the UE is in the dual-camped state, that is, when the GSM module accesses the GSM network and the LTE module accesses the LTE network, the LTE module may send, according to the information sent by the GSM module, the base station a message used to report a measurement result, where the message includes the state information, and the state information includes the identity of the GSM cell that the UE currently accesses. Optionally, the state information further includes at least one of the current access state of the UE and the service state of the GSM module.

It should be understood that after the UE enters the connected state, the base station may deliver a message used to perform LTE intra-frequency measurement; and when signal quality of an LTE serving cell is lower than the threshold value, and there is no another intra-frequency neighboring cell whose signal quality is better than that of the LTE serving cell, the UE may report an A2 event. It should be further understood that the sequence numbers in the above processes do not indicate orders of execution, and the execution order of each process should be determined by the functions and internal logic thereof, and the sequence numbers should not constitute any limitation to the implementation of the embodiment of the present invention.

According to the method for changing an access cell in the embodiment of the present invention, when the UE leaves the coverage of the first radio network and the access state of the UE is the dual-camped state, the first cell of the first radio network that the UE currently accesses is changed to the second cell of the second radio network that the UE currently accesses, so as to avoid a cell change failure caused by an incorrect target cell during cell reselection or handover, thereby accurately changing the access cell, reducing the network delay, and improving the user experience.

FIG. 4 describes a scenario where the UE passively reports the state information according to the second message sent by the base station and used to instruct the UE to perform inter-system measurement, and a scenario where the UE actively reports the state information according to the embodiment of the present invention is described below with reference to FIG. 5. As shown in FIG. 5, when the UE's first module is in the connected state, the method includes the following steps:

S410. When the UE's first module accessing the first radio network is in the connected state, the UE sends the state information to the base station, where the state information includes the access state of the UE.

Optionally, the state information further includes the service state of the first module and/or the service state of the second module.

For example, when determining that the GSM cell that the UE accesses is changed, the UE sends the base station a message used to report a state, where the message may include the state information, so as to promptly notify the base station of the GSM cell that the GSM module of the UE currently accesses.

S420. The UE determines that the UE leaves the coverage of the first radio network.

S430. When determining that the UE leaves the coverage of the first radio network, the UE sends base station a first message used to report an A2 event.

S440. The UE receives the handover command, which is sent by the base station according to the first message and the state information, where the handover command is used to instruct the UE to be handed over to the second cell that the UE currently accesses. After receiving the first message used to report the A2 event, the base station learns that the UE is about to leave or has already left the coverage of the first radio network, and then the base station may decide, according to previously saved state information, or by referring to other information such as load information, a UE capability, and a GSM cell capability, to hand the UE over to the second cell that the UE currently accesses.

S450. According to the handover command, the UE initiates a handover from the first radio network to the second radio network by taking the second cell as a target cell when the access state of the UE is the dual-camped state. For example, the UE is handed over from the LTE cell to the GSM cell that the UE currently accesses, so that the UE switches the network accessed in the PS domain from the LTE network to the GSM network. For example, the UE initiates a common process of a handover from the LTE network to the GSM network, where the target cell is the GSM cell that the UE currently accesses, so that the UE can be handed over from the LTE cell to the GSM cell that the UE currently accesses.

In the embodiment of the present invention, for example, a GSM module of the UE may send any information of the identity of the GSM cell that the UE currently accesses, and the service state and the access state of the GSM module to an LTE module of the UE. Optionally, the GSM module sends the identity of the GSM cell, and the service state and the access state of the GSM module to the LTE module. In this way, when the UE is in the dual-camped state, that is, when the GSM module accesses the GSM network and the LTE module accesses the LTE network, the LTE module may send the base station a message used to report a measurement result, where the message includes the state information, and the state information includes the identity of the GSM cell that the UE currently accesses. Optionally, the state information further includes at least one of the current access state of the UE and the service state of the GSM module.

It should be understood that after the UE enters the connected state, the base station may deliver a message used to perform LTE intra-frequency measurement; and when signal quality of an LTE serving cell is lower than the threshold value, and there is no another intra-frequency neighboring cell whose signal quality is better than that of the LTE serving cell, the UE may report an A2 event. It should be further understood that the sequence numbers in the above processes do not indicate orders of execution, and the execution order of each process should be determined by the functions and internal logic thereof, and the sequence numbers should not constitute any limitation to the implementation of the embodiment of the present invention.

According to the method in the embodiment of the present invention, when the UE leaves the coverage of the first radio network and the UE is in the dual-camped state, the UE sends the base station a message that includes the state information when determining that the currently accessed second cell is changed, so as to enable the base station to send a handover command, where the second cell that the UE currently accesses is a target cell, to the UE directly according to the prestored state information after receiving the message sent by the UE and used to report the A2 event. This avoids a cell change failure caused by an incorrect target cell during cell reselection or handover, thereby accurately changing the access cell, reducing the network delay, and improving the user experience.

The method for changing an access cell according to the embodiment of the present invention has been described from the perspective of a user equipment with reference to FIG. 2 to FIG. 5, and a method for changing an access cell according to an embodiment of the present invention is described below in detail from the perspective of a base station with reference to FIG. 6 to FIG. 8.

It should be understood that in the embodiment of the present invention, it is assumed that a first radio network includes an LTE network, that a second radio network includes a GSM network, that a UE's first module accessing the first radio network includes an LTE module, and that a UE's second module accessing the second radio network includes a GSM module, but the present invention is not limited thereto.

Figure 6:
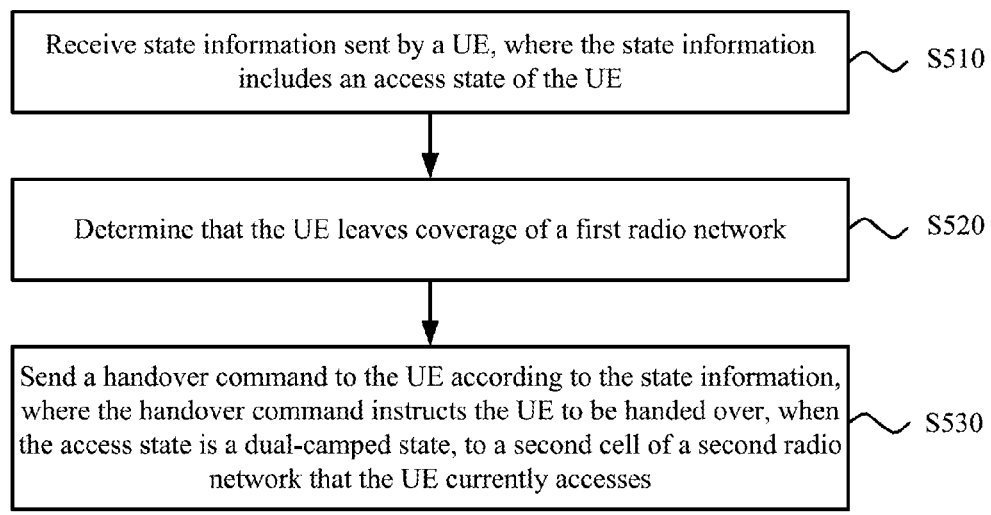
FIG. 6 is a schematic flowchart of a method for changing an access cell according to another embodiment of the present invention.

FIG. 6 is a schematic flowchart of a method for changing an access cell according to another embodiment of the present invention. As shown in FIG. 6, the method includes the following steps:

S510. A base station receives state information sent by a user equipment UE, where the state information includes an access state of the UE.

S520. The base station determines that the UE leaves coverage of a first radio network.

S530. The base station sends a handover command to the UE according to the state information, where the handover command instructs the UE to be handed over, when the access state is a dual-camped state, to a second cell of a second radio network that the UE currently accesses.

When the UE leaves the coverage of the first radio network and the UE is in the dual-camped state, according to the state information reported by the UE, the base station may decide to hand over the UE, and send the handover command to the UE, where the handover command is used to instruct the UE to be handed over to the second cell of the second radio network that the UE currently accesses, so as to switch a network accessed in a PS domain from the first radio network to the second radio network, for example, to switch the network accessed in the PS domain from an LTE network to a GSM network.

According to the method for changing an access cell in the embodiment of the present invention, when the UE leaves the coverage of the first radio network and the access state of the UE is the dual-camped state, a first cell of the first radio network that the UE currently accesses is changed to the second cell of the second radio network that the UE currently accesses, so as to avoid a cell change failure caused by an incorrect target cell during cell reselection or handover, thereby accurately changing an access cell, reducing network delay, and improving user experience.

In the embodiment of the present invention, the state information includes an identity (ID) of the second cell that the UE currently accesses, and the state information may further include at least one of the current access state of the UE and a service state of a second module. Certainly, the state information may further include a service state of a UE's first module, that is, whether the first module is in an idle state or a connected state. The current access state of the UE is whether the UE is currently in the dual-camped state (Single Camped or Multi Camped), and the service state of the first module or the second module is whether the first module or the second module is in the connected state (Connected State) or the idle state (Idle State).

In the embodiment of the present invention, the base station performs handover decision according to the state information reported by the UE. It should be understood that the base station may perform handover decision by further considering other parameters such as load information. It is assumed that the UE is handed over from the LTE network to the GSM network, and a possible situation where the base station performs handover decision according to the state information as follows.

If the UE is in a single-camped state (that is, access state information of the default single-camped state is not changed), the base station decides to initiate a common process of a handover from the LTE network to the GSM network. A target cell for the handover is the GSM cell in a state report message.

If the UE is in the dual-camped state, the base station may perform decision according to information such as a UE capability, a GSM cell capability, and whether a GSM module is in the connected state, where the UE may send the UE capability to the base station by using a capability indication message, and the base station may further acquire the GSM cell capability according to operation, administration, and maintenance ("OAM") configuration.

Specifically, if the UE capability and the GSM cell capability support CS/PS concurrency, the base station decides that the UE initiates a common process of a handover from the LTE network to the GSM network. The target cell for the handover is the GSM cell in the state report message. If the UE capability or the GSM cell capability does not support CS/PS concurrency, and the GSM module is in the idle state, the base station decides that the UE initiates a common process of a handover from the LTE network to the GSM network, where the target cell for the handover is the GSM cell in the state report message. If the UE capability or the GSM cell capability does not support CS/PS concurrency, and the GSM module is in the connected state, the base station decides not to perform a handover, or the base station decides that the UE releases a PS service of the LTE network, so that the UE can initiate a PS service in the GSM network at an appropriate occasion.

The UE may passively report the state report message according to an instruction of the base station or actively report the state report message, which is described below with reference to FIG. 7 and FIG. 8, respectively.

Figure 7:
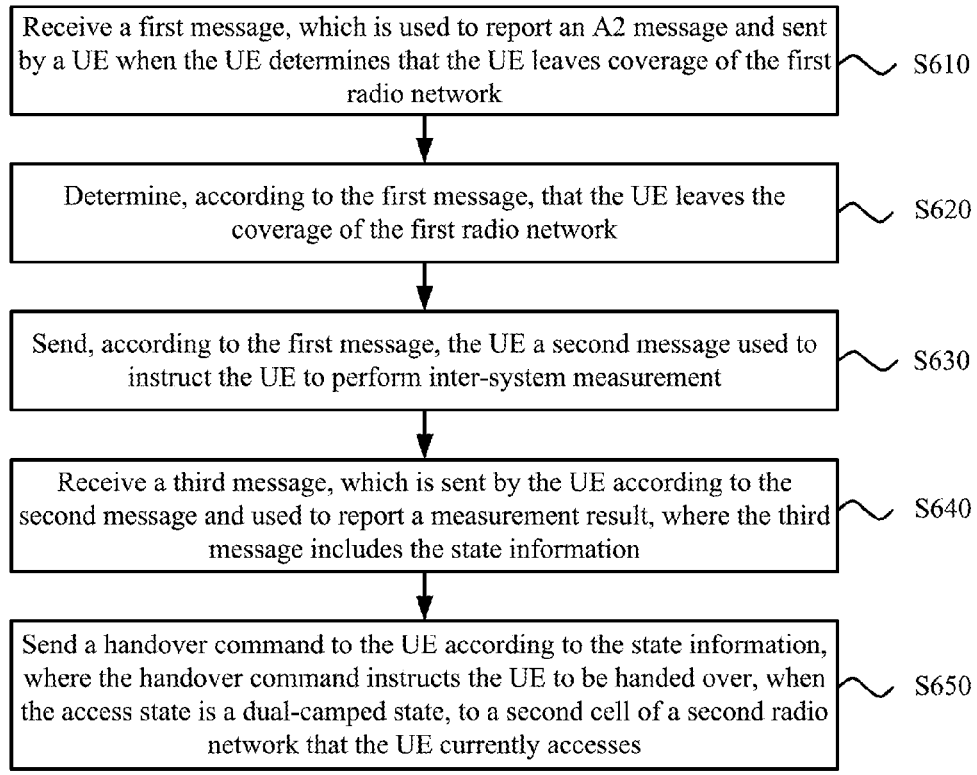
FIG. 7 is a schematic flowchart of a specific embodiment of the method for changing an access cell according to the another embodiment of the present invention.

FIG. 7 is a schematic flowchart of a specific embodiment of the method for changing an access cell according to the another embodiment of the present invention. As shown in FIG. 7, the method includes the following steps:

S610. The base station receives a first message, which is used to report an A2 event and sent by the UE when the UE determines that the UE leaves the coverage of the first radio network.

S620. The base station determines, according to the first message, that the UE leaves the coverage of the first radio network.

S630. The base station sends, according to the first message, the UE a second message used to instruct the UE to perform inter-system measurement.

S640. The base station receives a third message, which is sent by the UE according to the second message and used to report a measurement result, where the third message includes the state information. For example, when the UE is in the dual-camped state, the UE reports a message used to report the measurement result to the base station according to the message used to perform GSM inter-system measurement, where the message used to report the measurement result includes the state information, and the state information includes an identity of the GSM cell that the UE currently accesses. Optionally, the state information further includes at least one of the current access state of the UE and the service state of the GSM module.

S650. The base station sends a handover command to the UE according to the state information, where the handover command instructs the UE to be handed over, when the access state is the dual-camped state, to the second cell of the second radio network that the UE currently accesses.

For example, the base station sends the handover command to the UE according to the state information, where the handover command is used to instruct the UE to be handed over to the GSM cell. When the base station determines that the UE leaves the coverage of the LTE network and the UE is in the dual-camped state, the base station may send the handover command to the UE according to the state information, where the handover command is used to instruct the UE to be handed over to the GSM cell. It should be understood that the base station may determine that the UE is handed over to the GSM cell that the UE currently accesses according to the decision method described above.

Figure 8:
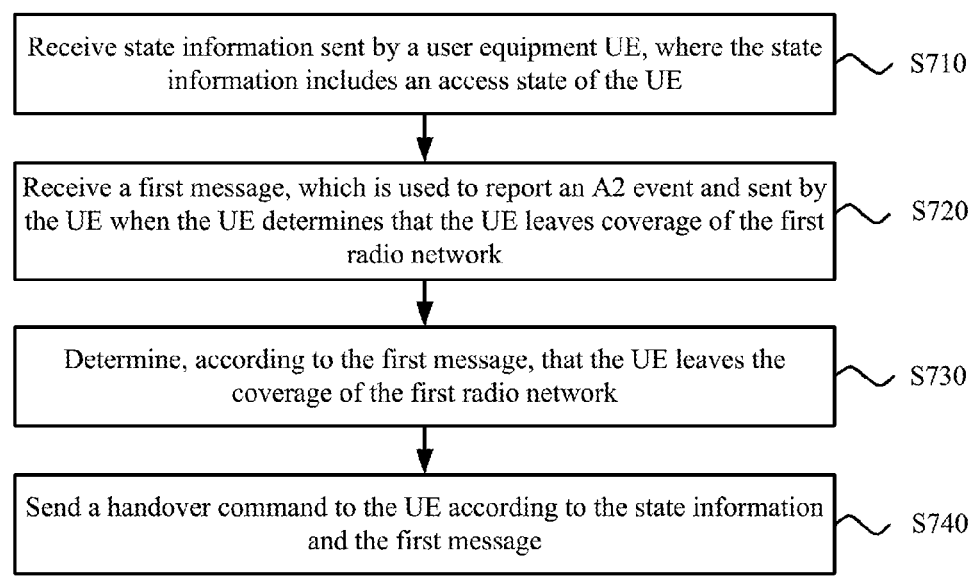
FIG. 8 is a schematic flowchart of another specific embodiment of the method for changing an access cell according to the another embodiment of the present invention.

FIG. 8 is a schematic flowchart of another specific embodiment of the method for changing an access cell according to the another embodiment of the present invention. As shown in FIG. 8, the method includes the following steps:

S710. The base station receives the state information sent by the user equipment UE, where the state information includes the access state of the UE.

S720. The base station receives the first message, which is used to report the A2 event and sent by the UE when the UE determines that the UE leaves the coverage of the first radio network.

S730. The base station determines, according to the first message, that the UE leaves the coverage of the first radio network.

Sending, by the base station, the handover command to the UE according to the state information when the UE leaves the LTE network and the UE is in the dual-camped state may include the following step:

S740. The base station sends the handover command to the UE according to the state information and the first message.

Optionally, the state information further includes at least one of the current access state of the UE and the service state of the GSM module.

In the embodiment of the present invention, because the base station saves the state information reported by the UE, after receiving from the UE the first message used to report the A2 event, the base station learns that the UE is about to leave or has already left the coverage of the first radio network, and then the base station may decide, according to the previously saved state information, or by referring to other information, such as load information, a UE capability, and a GSM cell capability, to hand the UE over to the second cell that the UE currently accesses. Optionally, the state information includes the identity of the second cell that the UE currently accesses. Optionally, the state information further includes at least one of the current access state of the UE and the service state of the GSM module.

In the embodiment of the present invention, receiving, by the base station, the state information sent by the UE includes: receiving, by the base station, state information sent by a UE's first module accessing the first radio network, where the state information includes a service state and an access state of the first module, and the identity of the second cell and a service state and an access state of a UE's second module accessing the second radio network, which are sent to the first module by the second module.

It should be understood that the sequence numbers in the above processes do not indicate orders of execution, and the execution order of each process should be determined by the functions and internal logic thereof, and the sequence numbers should not constitute any limitation to the implementation of the embodiment of the present invention.

According to the method for changing an access cell in the embodiment of the present invention, when the UE leaves the coverage of the first radio network and the access state of the UE is the dual-camped state, the first cell of the first radio network that the UE currently accesses is changed to the second cell of the second radio network that the UE currently accesses, so as to avoid a cell change failure caused by an incorrect target cell during cell reselection or handover, thereby accurately changing the access cell, reducing the network delay, and improving the user experience.

The methods for changing an access cell according to the embodiments of the present invention have been described in detail, and an apparatus for changing an access cell according to embodiments of the present invention is described below with reference to FIG. 9 to FIG. 12.

Figure 9:
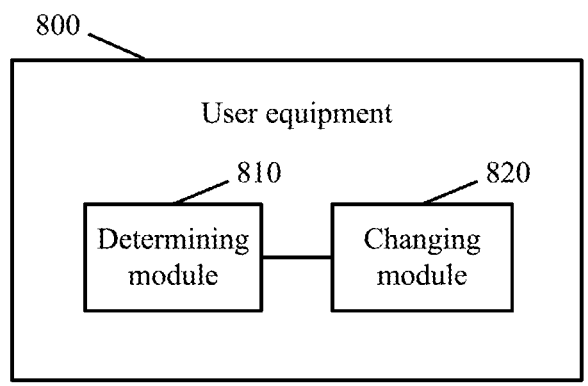
FIG. 9 is a schematic block diagram of a user equipment according to an embodiment of the present invention.

FIG. 9 is a schematic block diagram of an user equipment 800 according to an embodiment of the present invention. As shown in FIG. 9, the user equipment 800 includes a determining module 810 configured to determine that the user equipment UE leaves coverage of a first radio network. A changing module 820 is configured to, when an access state of the UE is a dual-camped state, change a first cell of the first radio network that the UE currently accesses to a second cell of a second radio network that the UE currently accesses.

According to the user equipment in the embodiment of the present invention, when the UE leaves the coverage of the first radio network and the access state of the UE is the dual-camped state, the first cell of the first radio network that the UE currently accesses is changed to the second cell of the second radio network that the UE currently accesses, so as to avoid a cell change failure caused by an incorrect target cell during cell reselection or handover, thereby accurately changing an access cell, reducing network delay, and improving user experience.

Optionally, the changing module 820 is further configured to initiate packet switched PS domain registration in the second cell when a UE's first module accessing the first radio network is in an idle state.

Figure 10A:
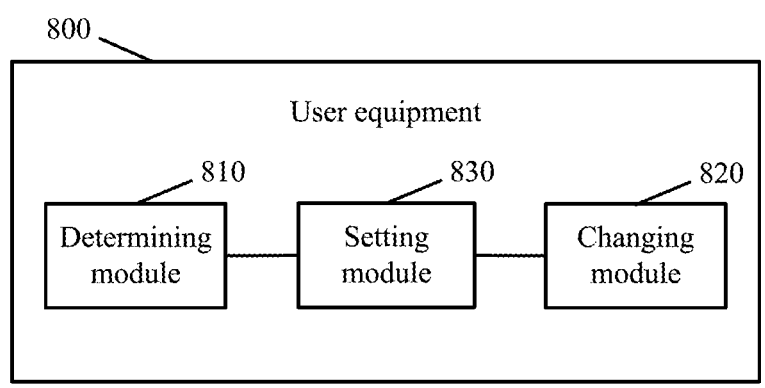
FIGS. 10A to 10D are schematic block diagrams of specific embodiments of the user equipment according to the embodiment of the present invention.

Optionally, as shown in FIG. 10A, the user equipment 800 further includes a setting module 830 configured to set a cell reselection priority of the second cell to the highest, or set an offset value for signal quality of the second cell. The offset value is used to enable the second cell to rank first in cell signal quality sorting, so that the UE can initiate PS domain registration in the second cell when determining that the UE leaves the coverage of the first radio network.

In the embodiment of the present invention, the changing module 820 is further configured to initiate a handover from the first radio network to the second radio network when the UE's first module accessing the first radio network is in a connected state. A target cell is the second cell of the second radio network that the UE currently accesses.

For example, the changing module 820 is specifically configured to initiate PS domain registration in the GSM cell when an LTE module is in the idle state; and initiate a common process of a handover from LTE to GSM when the LTE module is in the connected state, so as to switch a network accessed in a PS domain from the LTE network to the GSM network.

Specifically, when the determining module 810 determines that the user equipment 800 leaves the coverage of the Long Term Evolution LTE network, the setting module 830 sets the cell reselection priority of the GSM cell to the highest, or sets the offset value for the signal quality of the GSM cell, where the offset value is used to enable the GSM cell to rank first in the cell signal quality sorting, so that the UE can initiate PS domain registration in the GSM cell when determining that the UE leaves the coverage of the LTE network.

Figure 10B:
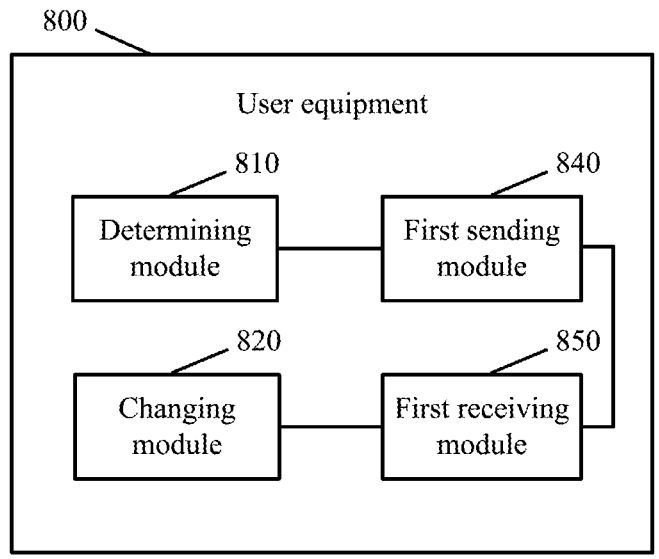

Optionally, as shown in FIG. 10B, the user equipment 800 further includes a first sending module 840 configured to send state information to the base station when the UE's first module accessing the first radio network is in the connected state. The state information includes the access state of the UE. A first receiving module 850 is configured to receive a handover command, which is sent by the base station according to the state information. The changing module 820 is further configured to initiate, according to the handover command, a handover from the first radio network to the second radio network by taking the second cell as a target cell when the access state of the UE is the dual-camped state.

Figure 10C:
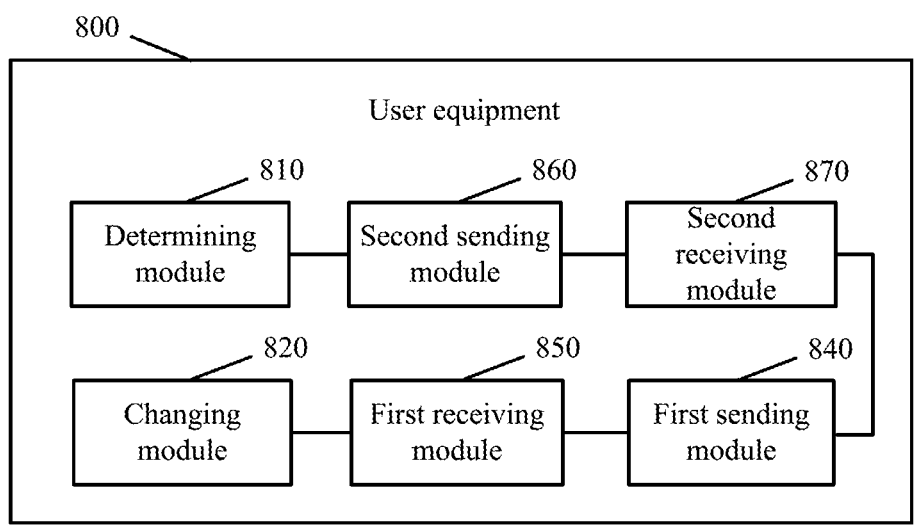

Optionally, as shown in FIG. 10C, the user equipment 800 further includes a second sending module 860 configured to, when determining that the UE leaves the coverage of the first radio network, send the base station a first message used to report an A2 event. A second receiving module 870 is configured to receive a second message, which is sent by the base station according to the first message and used to instruct the UE to perform inter-system measurement.

The first sending module 840 is further configured to, according to the second message, send the base station a third message used to report a measurement result, where the third message includes the state information.

Specifically, as shown in FIG. 10C, for example, when the determining module 810 determines that the user equipment 800 leaves the coverage of the Long Term Evolution LTE network, the second sending module 860 sends the base station the first message used to report the A2 event, then the second receiving module 870 receives the second message, which is sent by the base station according to the first message and used to instruct the UE to perform GSM inter-system measurement, then, according to the second message, the first sending module 840 sends the base station the third message used to report a measurement result when the UE is in the dual-camped state, where the third message includes the state information, and the state information includes an identity of the GSM cell that the UE currently accesses, and finally the first receiving module 850 receives the handover command, which is sent by the base station according to the state information, where the handover command is used to instruct the UE to be handed over to the GSM cell, and therefore the changing module 820 implements, according to the handover command, a handover to the GSM cell that the UE currently accesses.

Figure 10D:
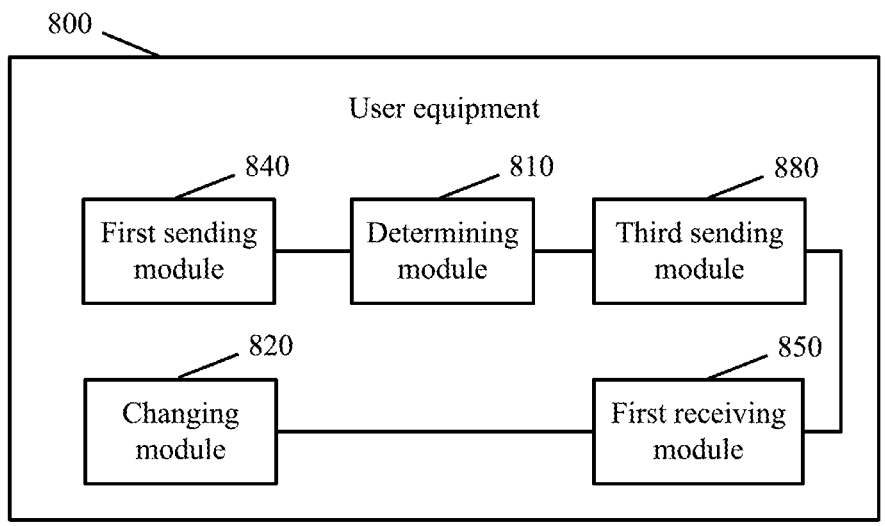

Optionally, as shown in FIG. 10D, the user equipment 800 further includes a third sending module 880, configured to, after the first sending module sends the state information to the base station and when determining that the UE leaves the coverage of the first radio network, send the base station a first message used to report an A2 event.

The first receiving module 850 is further configured to receive the handover command, which is sent by the base station according to the first message and the state information.

Specifically, as shown in FIG. 10D, for example, the first sending module 840 sends the state information to the base station when the LTE module of the UE is in the connected state, where the state information includes the access state of the UE, and the state information includes the identity of the GSM cell that the user equipment currently accesses; then, when the determining module 810 determines that the UE 800 leaves the coverage of the Long Term Evolution LTE network, the third sending module 880 sends the base station the first message used to report the A2 event, and finally, the first receiving module 850 receives the handover command, which is sent by the base station according to the first message and the state information, where the handover command is used to instruct the UE to be handed over to the GSM cell that the UE currently accesses, and therefore the changing module 820 implements, according to the handover command, a handover to the GSM cell that the UE currently accesses. Optionally, the first sending module 840 is specifically configured to send a state report message to the base station when determining that the GSM cell that the UE accesses is changed, where the state report message includes the state information.

Optionally, the state information further includes at least one of the current access state of the UE and a service state of the GSM module. Optionally, the state information further includes a service state of the LTE module.

Optionally, the UE includes a first module accessing the first radio network and a second module accessing the second radio network. The second module may send an identity of the second cell and a service state and an access state of the second module to the UE's first module, so that the first module can send the state information to the base station according to the identity, and the service state and the access state of the second module.

The user equipment 800 according to the embodiment of the present invention may correspond to the user equipment UE in the embodiments of the present invention, and further, the above and other operations and/or functions of the modules of the user equipment 800 are respectively used to realize the corresponding processes of the method illustrated in FIG. 2 to FIG. 5. For simplicity, details will not be described herein again.

According to the user equipment in the embodiment of the present invention, when the UE leaves the coverage of the first radio network and the access state of the UE is the dual-camped state, the first cell of the first radio network that the UE currently accesses is changed to the second cell of the second radio network that the UE currently accesses, so as to avoid a cell change failure caused by an incorrect target cell during cell reselection or handover, thereby accurately changing the access cell, reducing the network delay, and improving the user experience.

Figure 11:
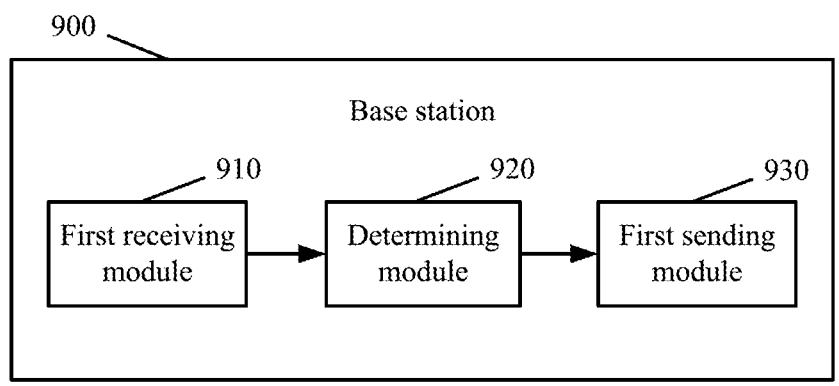
FIG. 11 is a schematic block diagram of a base station according to an embodiment of the present invention.

FIG. 11 is a schematic block diagram of a base station 900 according to another embodiment of the present invention. As shown in FIG. 11, the base station 900 includes a first receiving module 910, configured to receive state information sent by a user equipment UE, where the state information includes an access state of the UE. A determining module 920 is configured to determine that the UE leaves coverage of a first radio network. A first sending module 930 is configured to send a handover command to the UE according to the state information. The handover command instructs the UE to be handed over, when the access state is a dual-camped state, to a second cell of a second radio network that the UE currently accesses.

According to the base station in the embodiment of the present invention, when the UE leaves the coverage of the first radio network and the access state of the UE is the dual-camped state, a first cell of the first radio network that the UE currently accesses is changed to the second cell of the second radio network that the UE currently accesses, so as to avoid a cell change failure caused by an incorrect target cell during cell reselection or handover, thereby accurately changing an access cell, reducing network delay, and improving user experience.

Figure 12A:
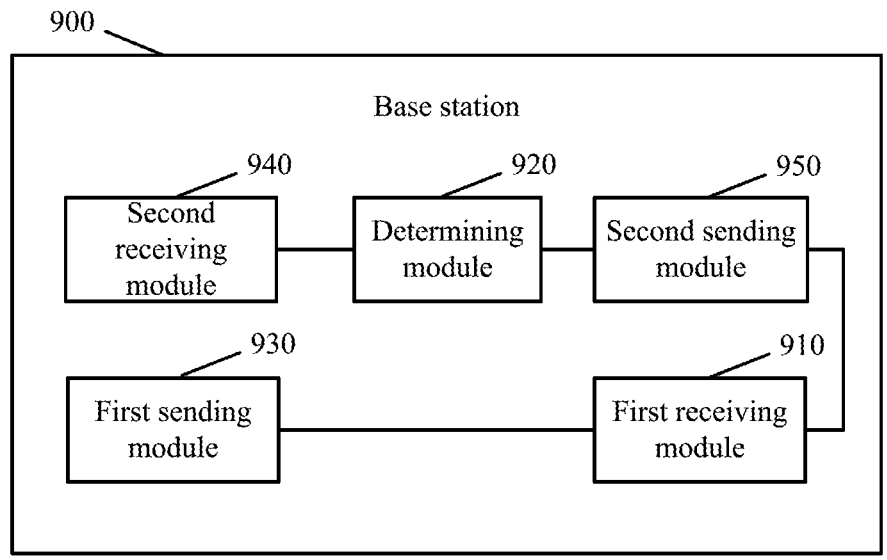
FIGS. 12A to 12B are schematic block diagrams of specific embodiments of the base station according to the embodiment of the present invention.

Optionally, as shown in FIG. 12A, the base station 900 further includes a second receiving module 940, configured to receive a first message, which is used to report an A2 event and sent by the UE when the UE determines that the UE leaves the coverage of the first radio network. A second sending module 950 is configured to, according to the first message, send the UE a second message used to instruct the UE to perform inter-system measurement.

The determining module 920 is further configured to determine, according to the first message, that the UE leaves the coverage of the first radio network.

The first receiving module 910 is further configured to receive a third message, which is sent by the UE according to the second message and used to report a measurement result, where the third message includes the state information.

Figure 12B:
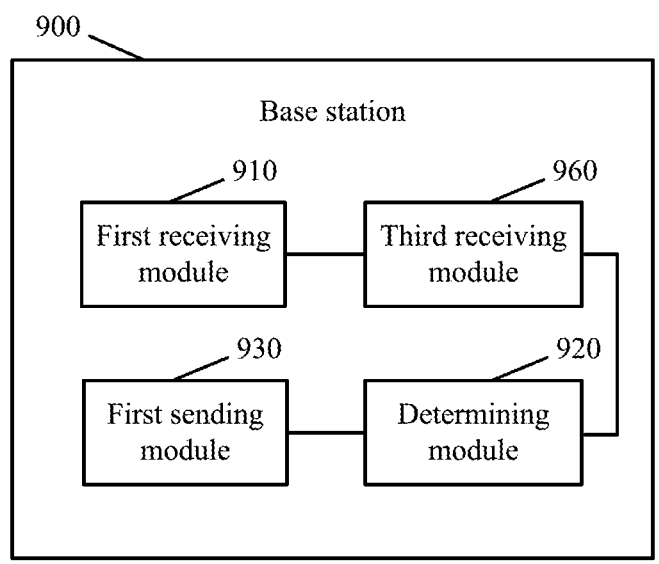

Optionally, as shown in FIG. 12B, the base station 900 further includes a third receiving module 960, configured to, after the first receiving module receives the state information sent by the UE, receive the first message, which is used to report the A2 event and sent by the UE when the UE determines that the UE leaves the coverage of the first radio network.

The determining module 920 is further configured to determine, according to the first message, that the UE leaves the coverage of the first radio network.

The first sending module 930 is further configured to send the handover command to the UE according to the state information and the first message.

Optionally, the state information further includes at least one of the current access state of the UE and a service state of a GSM module.

Optionally, the first receiving module 910 is further configured to receive state information sent by a UE's first module, where the state information includes a service state and an access state of the first module, and an identity of the second cell and a service state and an access state of a second module of the UE, which are sent by the second module to the first module.

The base station 900 according to the embodiment of the present invention may correspond to the base station in the embodiments of the present invention, and further, the above and other operations and/or functions of the modules of the base station 900 are respectively used to realize the corresponding processes of the method illustrated in FIG. 6 to FIG. 8. For simplicity, details will not be described herein again.

According to the base station in the embodiment of the present invention, when the UE leaves the coverage of the first radio network and the access state of the UE is the dual-camped state, the first cell of the first radio network that the UE currently accesses is changed to the second cell of the second radio network that the UE currently accesses, so as to avoid a cell change failure caused by an incorrect target cell during cell reselection or handover, thereby accurately changing the access cell, reducing the network delay, and improving the user experience.

A person of ordinary skill in the art may appreciate that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of every embodiment according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It can be clearly understood by a person skilled in the art that, for the purpose of convenient and brief description, for a detailed working process of the foregoing system, apparatus and unit, reference may be made to the corresponding process in the method embodiments, and the details will not be described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units herein may be selected according to the actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any equivalent modification or replacement figured out by a person skilled in the art within the technical scope of the present invention shall fall within the protection scope of the present invention. Therefore, the protection scope of the present invention shall be subject to the protection scope of the claims.

What is claimed is:

1. A method for changing an access cell, the method applies to a user equipment (UE), the method comprising:
   determining, by the UE, that the UE leaves coverage of a first radio network;
   sending, by the UE, to a base station, a first message that reports an A2 event in response to the UE determining that the UE leaves the coverage of the first radio network, wherein the A2 event indicates that a signal quality of a first cell of a first radio network that the UE currently accesses is lower than a threshold value;
   receiving, by the UE, a second message which is sent by the base station according to the first message and used to instruct the UE to perform inter-system measurement;
   sending, by the UE to the base station, a state information message comprising state information in a third message and a measurement result for a second cell of a second radio network, wherein the state information comprises an access state of the UE, and wherein the measurement result for the second cell is used for the base station instructing the UE to initiate a handover from the first cell to the second cell, wherein the access state of the UE is a dual-camped state that indicates the UE currently accesses the first cell of the first radio network and the second cell of the second radio network;
   receiving, by the UE, a handover command that is sent by the base station according to the state information and that instructs the UE to initiate a handover of service in the first cell from the first cell to the second cell; and
   when the UE is in a connected state in the first cell of the first radio network, initiating, by the UE, the handover of the service in the first cell from the first cell to the second cell.

2. The method according to claim 1, wherein the handover command is sent by the base station according to the first message and the state information.

3. The method according to claim 1, the method further comprising sending, by the UE, an identity of the second cell to a base station.

4. The method according to claim 1, the method further comprising:
   when the UE is in an idle state in the first cell of the first radio network, cell-reselecting, by the UE, from the first cell to the second cell.

5. The method according to claim 4, the method further comprising:
   when the UE is not registered in a packet switched (PS) domain in the second cell, initiating, by the UE, PS domain registration in the second cell.

6. The method according to claim 4, wherein the method further comprises:
   setting, by the UE, a cell reselection priority of the second cell to be the highest priority, or setting, by the UE, an offset value for signal quality of the second cell, wherein the offset value is used to enable the second cell to rank first in cell signal quality sorting.

7. A user equipment (UE), the UE comprising:
   a transmitter;
   a receiver;
   a processor connected to the transmitter and the receiver;
   a non-transitory computer readable medium connected to the processor and having stored thereon instructions, that when executed, cause the processor to:
     determine that the UE leaves coverage of a first radio network;
     sending, to a base station, a state information message comprising state information and a measurement result for a second cell of a second radio network, wherein the state information comprises the access state of the UE, wherein the state information message is a third message, and wherein the access state of the UE is a dual-camped state that indicates the UE currently accesses a first cell of the first radio network and the second cell of the second radio network; and
     initiate a handover of service in the first cell from the first cell to the second cell when the UE is in a connected state in the first cell;

wherein the transmitter is configured to send, to the base station, a first message that reports an A2 event in response to the processor determining that the UE leaves the coverage of the first radio network, wherein the A2 event indicates that a signal quality of the first cell of the first radio network that the UE currently accesses is lower than a threshold value;

wherein the receiver is configured to receive a second message which is sent by the base station according to the first message and used to instruct the UE to perform inter-system measurement;

wherein the receiver is further configured to receive a handover command that is sent by the base station according to the state information and that instructs the UE to initiate the handover of the service in the first cell from the first cell to the second cell; and wherein the measurement result for the second cell is used by the base station in instructing the UE to initiate a handover from the first cell to the second cell.

8. The user equipment according to claim 7, wherein the handover command is sent by the base station according to the first message and the state information.

9. The user equipment according to claim 7, wherein the transmitter is further configured to send an identity of the second cell to a base station.

10. The user equipment according to claim 7, wherein the non-transitory computer readable medium further has stored thereon instructions, that when executed, cause the processor to cell-reselect from the first cell to the second cell.

11. The user equipment according to claim 10, wherein the non-transitory computer readable medium further has stored thereon instructions, that when executed, cause the processor to initiate packet switched (PS) domain registration in the second cell when the UE is not registered in a PS domain in the second cell.

12. The user equipment according to claim 10, wherein the non-transitory computer readable medium further has stored thereon instructions, that when executed, cause the processor to set a cell reselection priority of the second cell to be the highest priority, or to set an offset value for signal quality of the second cell, wherein the offset value is used to enable the second cell to rank first in cell signal quality sorting.

13. A base station, wherein the base station serves a user equipment (UE) the base station comprising:
a receiver configured to receive a state information message sent by the UE and comprising state information and a measurement result for a second cell of a second radio network, wherein the state information comprises the access state of the UE, and wherein the access state of the UE is a dual-camped state that indicates the UE currently accesses a first cell of a first radio network and the second cell of the second radio network;
a processor;
a non-transitory computer readable medium connected to the processor and having stored thereon instructions, that when executed, cause the processor to:
determine that the UE leaves coverage of the first radio network; and
a transmitter configured to receive a first message that reports an A2 event in response to the processor determining that the UE leaves the coverage of the first radio network, the transmitter further configured to send a handover command to the UE when the receiver receives the state information and the processor determines that the UE leaves the coverage of the first radio network, wherein the handover command instructs the UE to be handed over from the first cell to the second cell, and wherein the A2 event indicates that a signal quality of the first cell of the first radio network that the UE currently accesses is lower than a threshold value;
wherein the transmitter is further configured to, according to the first message, send a second message used to instruct the UE to perform inter-system measurement; and
wherein the state information message is a third message, and wherein the measurement result for the second cell is used for the base station instructing the UE to be handed over from the first cell to the second cell.

14. The base station according to claim 13, wherein the transmitter is configured to send the handover command according to the first message and the state information.

15. The base station according to claim 13, wherein the receiver is further configured to receive an identity of the second cell.

* * * * *